United States Patent
Finn

[11] Patent Number: 6,095,089
[45] Date of Patent: Aug. 1, 2000

[54] MULTIPLE NESTING STRUCTURE FOR CLIFF SWALLOWS

[76] Inventor: Joseph Finn, 922 Massachusetts Ave. #53, Cambridge, Mass. 02139

[21] Appl. No.: 09/076,939

[22] Filed: May 13, 1998

Related U.S. Application Data

[60] Provisional application No. 60/046,484, May 14, 1997.

[51] Int. Cl.[7] ................................................ A01K 31/14
[52] U.S. Cl. ........................................ 119/329; 119/346
[58] Field of Search ................................. 119/329, 346, 119/437, 441

[56] References Cited

U.S. PATENT DOCUMENTS

| | | |
|---|---|---|
| 660,440 | 10/1900 | Ingram . |
| 738,460 | 9/1903 | Leveck . |
| 857,213 | 6/1907 | Stevens . |
| 1,448,544 | 3/1923 | Jesse . |
| 1,923,980 | 8/1933 | Hultine . |
| 2,174,326 | 9/1939 | Leibenguth . |
| 2,612,864 | 10/1952 | Kummeth . |
| 2,640,461 | 6/1953 | Dadlow . |
| 2,927,555 | 3/1960 | Flint . |
| 3,027,871 | 4/1962 | Peterson . |
| 3,044,444 | 7/1962 | Rosenthal . |

*Primary Examiner*—Peter M. Poon
*Assistant Examiner*—Yvonne R. Abbott
*Attorney, Agent, or Firm*—William Nitkin

[57] ABSTRACT

A nesting structure for cliff swallows is disclosed which provides spaces for multiple pairs of these colonial nesting birds to build their nearly enclosed mud nests. The self-contained structure independently provides the shape, size, rough surface texture and multiple nesting opportunities preferred by this species, and is conveniently attached to, or removed from, buildings, bridges or freestanding posts. The structure provides a wide roof overhang along its length to protect all underlying nests from sun and rain. A back wall establishes a uniform ideal height for all nests to be built by the birds. A narrow floor provides a solid footing for cliff swallows to anchor their adhesive mud nests without providing a sufficient base for undesirable species to build their loose, unattached grass nests. The compartmentalization of nests permits the inclusion of roof or back wall access doors away from the front which the swallows will nearly enclose with mud. The access doors allow for human inspection of the otherwise inaccessible nest interiors.

10 Claims, 8 Drawing Sheets

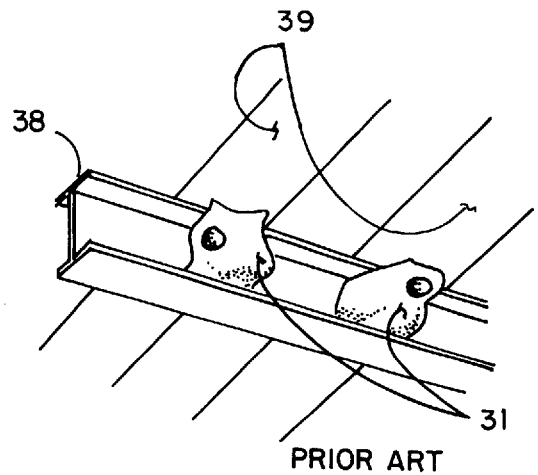
PRIOR ART
FIG. 5
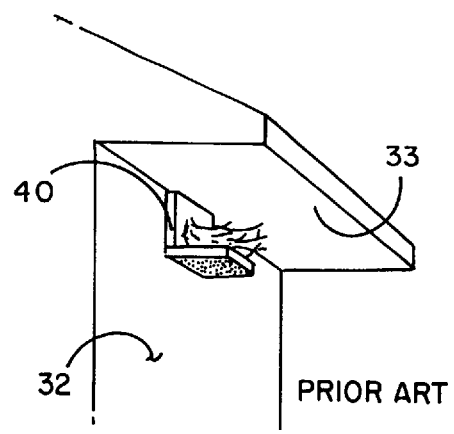
PRIOR ART
FIG. 6
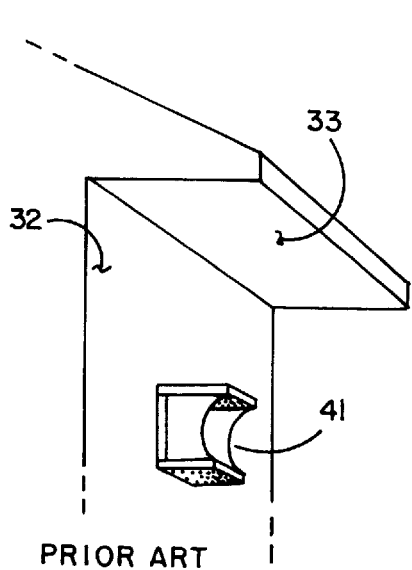
PRIOR ART
FIG. 7
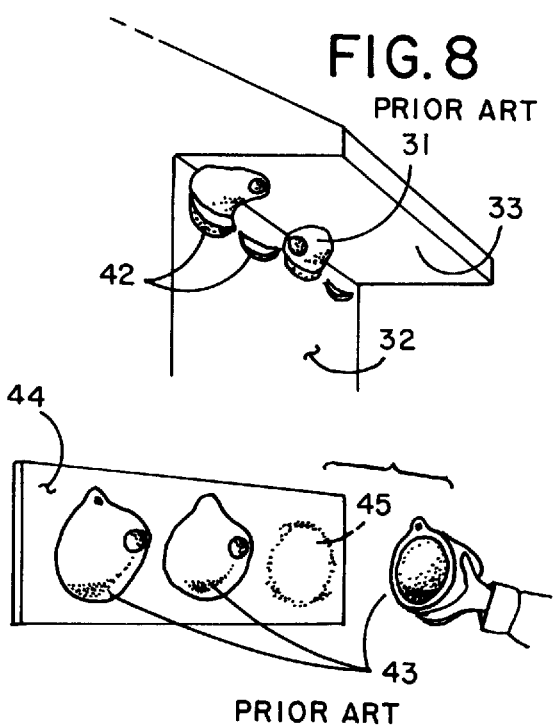
FIG. 8
PRIOR ART
PRIOR ART
FIG. 9

MULTIPLE NESTING STRUCTURE FOR CLIFF SWALLOWS

This application claim benefit to U.S. Provisional application 60/046,484 filed May 14, 1997.

BACKGROUND OF THE INVENTION

1. Field of the Invention

The present invention relates generally to birdhouses, nesting platforms and artificial nesting sites, and more specifically to a self-contained multiple nesting structure offering ideal partial enclosures which cliff swallows may then nearly enclose with their adhesive mud nests. The ideal spacing, size, shape, surface texture and multiple compartments are highly attractive to colonial nesting cliff swallows and protective of their nests against weather and collapse. The orderly, spaced divided arrangement of nests encouraged by the invention permits convenient further protection of nests once built and permits inspection of usually inaccessible nest interiors through correspondingly spaced roof or back access doors. As a self-contained unit, the present invention may be conveniently attached to or removed from the buildings or bridges, etc., on which cliff swallows might otherwise attempt to nest, despite inadequate structure or texture to support their nests.

2. Description of the Prior Art

Cliff swallows once nested only in natural settings such as on the jagged faces of substantially vertical rock cliffs. In such settings, they build their globular bottle-shaped nests in the corner or niche created when a vertical wall intersects a horizontal jag or overhang. Also known as "eave swallows," cliff swallows have adapted to nesting on man-made structures. On the exterior side of a barn or building, cliff swallows will build their adhesive mud nests up into the corner formed by the vertical wall and the horizontal overhang of the eave or soffit. These birds will also nest where structural members intersect vertically and horizontally on bridge understructures.

Cliff swallows are declining or underpopulated in some regions. The replacement of old, unpainted wood barns and bridges with regularly painted modern steel structures has deprived these birds of the rough adhesive nesting surfaces they had adapted to. Collapse of nests from smooth buildings or bridge surfaces is a problem for the species.

One prior art device, described in *Nest Boxes for Alberta Birds* by Shantz and Pearman, on page 24, to attract cliff swallows and prevent nest collapse, is to attach a board high on the side of a building nailed flat a few inches below the eave. With the narrow edge of the attached board serving as the foundation, swallows will randomly build along its length, also attaching nests to the small section of wall and eave above. While the applied board edge offers some support to the nests, the remaining support structure of the building upper wall and eave may not be sufficiently porous to hold the nests. If nests supported in this way collapse, there is not enough width of the board edge to hold eggs or nestlings. With no vertical dividers, swallows must build side walls as well as the enclosing front wall, with greater expenditure of time in a short breeding season. With no vertical dividers, or no vertical support other than the wall of the building, swallow nests will often be built side by side with shared mud walls. When one nest collapses, adjacent nests may also collapse. Since the nests are built randomly with irregular gaps between nests or groups of nests, and since there are no convenient vertical points of attachment, such as the dividers of the present invention, it would be difficult to attach a protective or supportive band, as is possible with the dividers of the present invention, once nests are built. The present inventor is not aware of any such prior art use of a strap or a band applied to protect existent nests.

With the nests attached directly to non-removable parts of a building, they cannot be taken down for inspection or cleaning without destroying them. Nor can they be inspected in place, nor can traps for destructive competing species be set within the nests, as is possible with the present invention. With nests attached directly to a building, nest parasites may more easily infiltrate interiors used by humans. Randomly located nests may create an untidy appearance, and directly applied nests may degrade paint finishes.

Another prior art artificial nesting opportunity for cliff swallows is one that is not created deliberately. In addition to nesting where the vertical surface of a large beam, or I-beam webbing, meets a horizontal supported surface, or I-beam upper flange, cliff swallows will build their nests between closely spaced upper and lower flanges on small I-beams. On small I-beams, the lower flange may provide a good width for a nest foundation, but the matching upper flange will be far too narrow to support the upward, forward projection of the nest. Only where broader structural surfaces or members cross the top of the supporting small I-beam are cliff swallows offered sufficient nest attachment surface overhead. However, movement by thermal expansion and vehicle vibration may fracture nests attached to two adjacent but separate members or surfaces.

As with the prior art building eave nesting situations already noted, smoothly painted surfaces of bridge I-beams, structural members and surfaces may not be porous or rough enough to hold nests for long. And again, the lack of spaced, supporting vertical walls requires swallows to construct their own weaker, potentially collapsible nests with shared sidewalls. Also, nests attached directly to a bridge or other permanent structure cannot be temporarily taken down, internally inspected in place, or opened for setting a trap for problem species. Further, nests attached directly to bridges degrade paint finishes and nests must be destroyed for bridge painting.

Another prior art cliff swallow nesting situation occurs where a vertical wall intersects a horizontal or downward sloping eave, as previously described, and a projecting rafter end creates an additional supporting vertical wall for the adjacent nest. This nesting situation is shown photographically in *Birds Nests* by Harrison on page 133. Since the spacing and shape of such building rafters is very wide and not intended to determine the number or orientation of nests built against them or between them, swallows will use, or not use, these non-deliberate niches inefficiently, however they choose, and orient nests in many directions. Aside from the additional vertical wall provided only to one side of only those nests which abut a rafter, this situation shares all the negative aspects of the structurally simpler wall/eave situation described previously.

A similar prior art situation has been recorded photographically in *Birds of America* (Garden City Publishing 1936) section on Swallows on page 85. A wide horizontal shelf has been permanently attached directly to the side of a barn with two widely spaced support brackets underneath. One nest has been built underneath abutting one bracket, but facing in a sideways direction. A second nest shown does not take advantage of the second bracket and faces a forward direction. With nests partially attached to the side of the barn as well as to the underside of the attached shelf, the structure is not removable for inspection, etc. And aside from the additional nest attachment surface provided only to one side of only those nests which abut a support bracket, this prior art device also shares all the negative aspects of the wall/eave situation described previously.

Other prior art nesting shelves or platforms designed for other species relate somewhat to the present invention. These may be simple, short, relatively wide, horizontal shelves mounted fairly close to overhanging eaves for shelter, as shown in *Nest Boxes for Alberta Birds* on page 24 or they may be self-contained and more enclosed with a wide floor, fairly high back, wide roof, partial or complete sides and open front. These are intended for species which do not build the nearly enclosed nests which cliff swallows build. These species simply build open bowl-shaped nests which rest on the square or nearly square rectangular floors. These prior art structures accommodate single nests only, and since they are mounted singly well away from others, they do not accommodate the colonial nesting requirements of cliff swallows. The wide floors of these structures, not necessary for cliff swallows, may, however, allow undesirable birds to build their loose grass nests. Were cliff swallows to build in and nearly enclose such a structure, the interior would be inaccessible, lacking the access door of the present invention.

Finally, partial or complete artificial cliff swallow nests have been made of fired clay or concrete/earthen mixtures. Swallows will complete, or accept complete, these substitute nests. These partial or complete artificial nests in the prior art have been single nest structures which are, one by one, attached to or hung on the side of a building. An example of such an artificial nest is shown in *Woodworking for Wildlife* by Henderson on page 43. As individual nesting units, these cumulatively require more time to install or remove than the multiple nesting structure of the present invention. In the case of the partial artificial nests, which are essentially half bowls, placement must be close to an eave to provide the overhead protection and structure for the swallows to complete the nests. A series of these half bowls, placed linearly up close to the eave creates essentially the same situation as does the edge of a 2" by 4" board attached close to the eave. Nests are supported from below, but upper parts of the nests completed by the birds may face different directions, and so are difficult to retroactively protect from collapse as is conveniently possible with the present invention. Since both the artificial base and bird-built upper portions are attached directly to the building, the negative aspects of possible poor adhesion to building surfaces, spread of parasites into building interiors, and inaccessibility of nest interiors all apply. With the insubstantial side walls of these half bowl partial nests, cliff swallows must do substantial building to complete them, almost as when building on a mere 2"×4" board edge base. Nest building and repairs to collapsed or partially collapsed nests can consume enough time in breeding season to limit production of young.

More nearly complete, or complete, artificial nests are also attached, one by one, in numbers to building sides or to boards nailed flat against sides of buildings. These strong structures are safe from collapse and require little building by cliff swallows. These prior art structures usually have no back wall. They are open where the back of the artificial nest meets the surface on which they are mounted. This permits cleaning through the open back when these artificial nests are removed after the breeding season. However, during the breeding season cliff swallows typically seal the small gap between the artificial nest and mounting surface, making removal disruptive. Also, since the entire nest must be handled and turned to inspect its contents, disturbed nestlings may be frightened out, and eggs may be dropped. In contrast, in the present invention, the nests remain in place while only an access door is opened for inspection with minimal disturbance to nest and contents. One major drawback to complete, or nearly complete, artificial nests is that during the off-season, destructive English sparrows will find shelter in these near enclosures. And once familiar with these nesting cavities, aggressive sparrows will kill cliff swallows for control of the cavities during breeding season. With the present invention, the front wall of mud built by migratory swallows may be easily broken out after the breeding season, so that non-migratory, destructive English sparrows are not given shelter over winter.

Finally, prior art artificial nests are costly or time-consuming to manufacture, as they are sculpted or molded complex shapes in mineral materials which must be dried, and cured or fired. The present invention permits use of more easily worked material, being wood, to manufacture cliff swallow nesting sites economically.

As discussed above, prior art devices and non-deliberately occurring prior art situations are inferior to the present invention with respect to one or more of the following considerations: acceptability by desirable cliff swallows versus undesirable species, access to nest interiors in season for inspection and control, passive and active protection of nests from collapse or inflicted damage, convenience of installation or removal, adaptability to building, bridge or post mounting, protection of mounting structures from parasite infestation or surface degradation, orderly attractiveness, and ease of manufacture, packaging and storage.

SUMMARY OF THE INVENTION

It is, in general, an object of the present invention to provide, in a well integrated design, a conveniently and universally mountable cliff swallow multiple nesting structure which is highly attractive to this species, unattractive to problem species, passively protective of nests while permitting convenient active protection and non-disruptive internal human management access of occupied enclosed nests, protective of mounting edifices from problems nestings might cause, orderly in appearance and economical to manufacture, as specified in the further objects stated below.

It is a further object of the present invention to provide a self-contained, ideal, multiple nesting structure which is not dependent on the building, bridge or poles on which it is mounted to provide any of the structural features required by cliff swallows, other than an acceptable mounting height.

It is a further object of the present invention that this self-contained one-piece multiple nesting structure, by virtue of its material and form, permit quick, convenient attachment and establishment of multiple nesting opportunities in a variety of settings. It is a still further object that this multiple nesting structure be quickly, conveniently removable for study or service of either the nesting or supporting structure.

It is a further object of the present invention to provide the closely spaced, ideally sized, shaped, and textured partial enclosures these cliff swallows have been discovered to prefer, through the present inventor's own field research. And it is an object in providing nesting spaces attractive to cliff swallows, to do so without creating spaces attractive to destructive English sparrows. And it is an object to integrate means of trapping into the design.

It is a further object of the present invention to provide sufficient passive structure to reduce the need for nest building, to encourage structurally sound attachment and construction by the swallows and to support nests. It is an object to provide a rough surface texture to retain adhered nests. And it is an object to have swallows attach nests only to securely joined parts of the same self-contained specialized structure. And it is an object that this structure, being independent, may be isolated from vibration or expansion.

It is a further object of the present invention to provide structure to encourage swallows to arrange and orient their usually random nests in an efficient, uniform and orderly pattern so that they may be actively supported or protected with retrofitted straps or guards very conveniently. And it is an object to provide structure for convenient attachment of these straps or guards.

It is a further object of the present invention to provide structure to force swallows to arrange and build their usually random nests in predetermined locations so that predictably positioned nest interiors will be accessible through pre-positioned access doors, making cliff swallow nest interiors accessible for beneficial management and scientific study.

It is a further object of the present invention that nests remain stationary when opened for inspection, that only doors to interiors be opened to minimize disturbance to nestlings or eggs.

It is a further object of the present invention that each nesting space be capable of being inspected and accessed independently of all others, in order to control problem birds in certain nests or band birds in certain nests without unnecessary disturbance to other occupants of the multiple nest structure.

It is a further object of the present invention that the overall design and location of access doors be such that swallows would be unlikely to seal doors shut with mud. And it is an object that these inspection and control openings be sufficiently large to admit a hand for cleaning, a bird trap, or to allow close-up photography.

It is a further object of the present invention, as a self-contained unit, to protect the man-made structures to which it is attached from damage to paint from nest mud or bird excrement. And it is an object, as a self-contained unit, to reduce infiltration of nest parasites into human habitation.

It is a further object of the present invention to provide a nesting structure which encourages cliff swallows to nest in a neat, attractive, orderly manner compatible with human architecture and convenient management. It is a further object of the present invention to provide a very effective cliff swallow nesting structure which is easy and economical to manufacture from common materials and is not subject to the packaging, shipping and storage problems of some prior art devices.

Finally, it is a further object of the present invention to provide various embodiments for very specialized situations.

The present invention fulfills the foregoing objects in specific ways to be described further below of the general form and function of the preferred embodiment: a roof, back wall and floor are joined along long edges to form a channel asymmetrical in cross-section. The slightly forward sloping wide roof is joined along its back edge to the upper edge of the back wall (vertical across its width). The lower edge of the back wall is joined to the back edge of the slightly forward sloping narrow floor. Two end panels and a series of partitioning panels divide the length of the channel into multiple partial enclosures, each sized to efficiently accommodate a cliff swallow nest. The slight downward slope of the roof sheds rain, and the slight downward slope of both inside roof and narrow floor accommodate the typical natural shape of cliff swallow nests. The shape of the end and divider panels, narrow where they join the floor, and projecting forward, and wider where they join the roof, also accommodate the shape of cliff swallow nests. A slim strip along the underside of the roof, crossing the upper front edge of end panels and divider panels also crosses each nest compartment. The strip helps to anchor mud nest fronts which swallows typically attach along the front edge of the floor, along the upwardly angled front edges of the end and divider panels, and along the inside edge of the crossing slip strip. With the need and tendency for swallows to build only a front mud wall, the access doors located in the roof to the rear of each nesting compartment can be opened for access to nest interiors without disturbing the mud portions of the nest chamber. Traps for English sparrows may be conveniently attached to the uniformly sized fronts or placed in the fairly uniformly sized interiors. After nests are built, a person may conveniently attach a strip of wood, fabric or wire mesh across the entire front below the bird entry holes to protect all nests from collapse or inflicted damage. And projectable guards may be attached beneath the floor of the entire nesting structure to protect nests, eggs, and nestlings from various threats. The entire structure is self-contained and may be attached conveniently to a variety of man-made structures which otherwise might not offer suitable nesting sites for cliff swallows.

The present invention, in fulfillment of the objects, does provide, in a well-integrated self-contained design, all the features attractive to, protective of, and useful in the management of, cliff swallows. The present invention can be quickly clamped to the horizontal flange of a structural member beneath a bridge, bracketed or screwed directly to a building wall or attached with pipe clips to freestanding pipes, conveniently establishing multiple nesting opportunities for cliff swallows in situations where none may exist, where inferior conditions may exist or where multiple, separate prior art devices would be difficult to attach or remove.

The present invention has proven to be highly attractive to cliff swallows. The regularly and closely spaced partitions stimulate the colonial (group) nesting behavior of the species. The partial enclosures are sized and roughly shaped to simulate natural nests when built under ideal conditions. As such, they are recognized by swallows as near ready-made nesting opportunities.

The wide protective roof overhang is a common essential feature which swallows seek out. The vertical back wall provides the second common feature. The uniquely sized floor provides a desirable footing for the adhesive nest of a swallow and enough room for cliff swallow eggs or nestlings even in the event of nest collapse. But the relatively narrow floor (narrow from front edge to back wall) will not accommodate the loose nest of an English sparrow unless already enclosed with a swallow-built front mud wall.

The present invention achieves the object of providing sufficient structure shaped and arranged to reduce the need for nest building, to encourage sound nest attachment and construction, and to support nests. The slight downward slope of the roof and floor in the preferred embodiment corresponds to the natural downward shape of the entrance tunnels common on naturally built nests. This shape reduces the need for excess mud filler commonly required in less precisely shaped prior art nesting situations. The end panels and divider panels eliminate the need for mud side walls, reducing the need for building by swallows. The securely attached dividers of the present invention eliminates the sequential collapse of adjacent nests with shared side mud walls as happens frequently in some prior art situations. The shape of end panels and divider panels corresponds to the forward projecting shape of the upper portions of naturally built nests, again reducing the need for mud building and filling. The slim strips attached along the underside of the roof, crossing the upper front edge of each compartment serves to somewhat limit the forward projection of entrance tunnels, thus reducing nest building and reducing the chance of collapse of long unsupported tunnels which could carry an older nestling with it. All structure is arranged in combination to reduce the need and time spent (days to weeks) in nest building, which benefits the swallows. And all structure is arranged to reliably support the mud portions of the nesting enclosures which swallows complete. The front edge of the floor provides a firm foundation, the areas along the front edges of the ends and dividers provide additional support, and the top crossing strip keeps or holds upper parts of mud wall, typically built behind it, in place. All surfaces to which swallows will attach mud may be made rough and porous at the time of manufacture, very easily if the structure is built of wood. And preferred rough, porous wood surfaces may be stained with a light bodied, semitransparent, non-glossy finish preserving the rough, porous qualities while color matching the nesting structure to the building or bridge for aesthetic reasons. And in the present invention, since swallows attach mud only to securely joined parts of the same self-contained structure, nests may be protected from the shearing caused by thermal expansion when, with the prior art, nests are attached to separate or dissimilar surfaces. Also the present invention, being a self-contained unit, may be mounted in such a way, for example, on rubber bushings, as to isolate all nests within it from destructive vibration under bridges caused by vehicular traffic.

The present invention has been proven to provide structure which encourages or forces cliff swallows to arrange their usually random nests in an orderly, predictable pattern for several beneficial purposes.

The regularly spaced dividers (and end panels) serve to make swallows locate nests predictably in the spaces between the dividers. With front mud walls attached fairly uniformly to the front edges of the partial enclosures offered by the present invention, it is possible to fulfill the object of conveniently retrofitting the entire structure with a strap, band or strip to hold lower portions of all nests in place. The end panels and edges of the dividers serve as convenient, uniform points of attachment for such retaining bands. Elastic or cloth bands, strips of wire mesh, or strips of netting may be stapled or otherwise attached to end panels alone or also to the front edges of the divider panels. All nests may thus be protected at once (or nests may be protected individually), much more securely and conveniently than with prior art random nest arrangements offering no points of strap attachment. When wire mesh is applied in the present invention, nests are protected from rocks thrown by vandals. Wire mesh may be cut and shaped to cover all but the bird entry holes, protecting nests from predatory animals. In situations where access to retrofit completed nests with a strap would be inconvenient, a permanent (wood) strap could be built-in, in advance, across the lower front portion of all enclosures, as shown in an alternate embodiment. (The increased enclosure, however, while protecting cliff swallow nests, also increases the chance of use by destructive English sparrows.) The retrofitting of all nests conveniently with a band or strap affords protection of swallow-built mud nests not available in the prior art.

Another benefit of providing uniformly spaced structure and encouraging more uniformly built nests is that it makes possible, conveniently, the attachment of a sparrow trap to the front of mud nests or open nest spaces, as well as within nests.

Another benefit of forcing swallows to locate nests in an orderly, predictable pattern is that it makes it possible to establish locations in advance for doors which will access nest interiors. With near-complete nest enclosures provided by the roof, back wall, floor, end panels and divider panels, swallows have only to build mud front walls. The forwardly angled end panels and dividers, along with the top crossing strip, encourage nest building along this forward portion of the provided partial enclosures, leaving the mud-free areas further back available for a roof or rear access door. In the preferred embodiment, large round access door openings are cut in the roof. Being quite large, the forward arc of these openings is fairly close to the open forward areas which will be enclosed with mud walls. And the forward edge of these openings cut in the roof will actually serve as a convenient additional point of attachment for swallows' nests. The forward arc complements the upper internal shape of the nests. And the loose, round, thin door panel is recessed into the thicker roof material from above. With the underside of the door panel set above the underside of the roof, it usually is not plastered with enough mud to be sealed shut.

Removal of each door panel, one by one, without handling the nest and without damage to mud nests, fulfills a very important object of the present invention. A person managing the cliff swallow colony can clearly see the usually inaccessible, partially natural nest interiors. Eggs and young may be inspected, studied or banded with little disturbance. Nesting activities may be photographed or videotaped. Insect pests, dead birds, etc., may be removed by hand. Traps may be set within the nests for English sparrows. Such benefits are impossible without greater disruption or nest damage in prior art situations.

The inclusion of access doors, an important object of the present invention, is made possible by the combination of spacing, sizing and shaping of structure already described.

Another way in which the present invention fulfills an object is in encouraging cliff swallows to arrange their nests in a way compatible with human architecture and convenience in management. Nests are not plastered randomly but concentrated where they are neatly acceptable to humans, and manageable with few trips up the ladder.

As a self-contained structure, the present invention accepts the applied mud nests itself, isolating building or bridge surfaces from paint damage by mud or bird excrement. And, as a self-contained structure, it is somewhat more likely to keep contained any nest parasites which otherwise directly infiltrate buildings from directly applied nests in prior art situations.

The present invention fulfills the object of providing an effective design which is easier and more economical to manufacture and ship than the few effective prior art devices. As a mostly rectilinear design which can be made out of common, easily worked materials such as wood, it is superior to designs formed of more difficult cast, molded or fired materials. As a multiple nest structure with shared walls, there is an economy of scale and an economy of material used.

Finally, since cliff swallows are somewhat adaptable, and certain mounting and management situations somewhat varied, the present invention is provided in various embodiments.

In one embodiment, the roof and floor are attached at right angles to the back wall, rather than at downward sloping angles, for ease of construction.

In another embodiment, alluded to previously, a strip, band or strap is permanently attached across the entire width of the structure with its lower edge along the front edge of the floor. This piece crosses each nesting opening, further enclosing them. This embodiment eliminates the need for attaching such a strip, band or strap once nests are complete, but such more enclosed spaces may be slightly less attractive to swallows and more attractive to English sparrows.

In another embodiment, the access doors are placed in the back of the present invention, for use in freestanding situations where pipe mountings at either end permit access through the back. It would be likely that a series of such rear access doors, in place of a solid, one-piece back wall, would be rectangular in shape.

In another embodiment, a series of short sections of tubing or pipe, cut at an angle to provide a small floor, forward and upwardly projecting sides, and a large overhang are set side by side into holes cut into a backboard. Removable round door panels are set into the open pipe ends at the rear to close them between inspections, and cliff swallows will nearly enclose them with partial nests at the front. The interior surfaces must be roughened for nest adhesion, and the slim crossing strip across the upper front lip of each pipe/tubing section will help to anchor mud nest fronts in place. The retroactively placed band described for the preferred embodiment may also be used in this design.

Each of the foregoing embodiments briefly described above fulfills the objects of the present invention.

BRIEF DESCRIPTION OF THE DRAWINGS

FIG. 5 illustrates a perspective view of directly applied nests built within the upper and lower flanges of a small I-beam, where separate crossing structural members provide an overhead attachment surface.

FIG. 6 illustrates a simple prior art shelf attached close to the eaves to accommodate a single nest of birds of those species which build a simple open bowl-shaped nest.

FIG. 7 illustrates a perspective view of a more sheltered, enclosed prior art nest platform not dependent on the eaves for shelter, also intended to accommodate a single nest of birds of those species which build a simple, open, bowl-shaped nest.

FIG. 8 illustrates a perspective view of a number of prior art, artificial, partial cliff swallow nests arranged close to the eaves. Two are shown to be completed by swallows, with mud applied directly to the building and with nests oriented randomly.

FIG. 9 illustrates a perspective view of a number of prior art, artificial, complete cliff swallow nests arranged independent of the eaves. One is shown to be removed, by hand, from the mounting board, leaving a mud outline where swallows have filled the gap between artificial nest and mounting board or building.

DESCRIPTION OF THE PREFERRED EMBODIMENT(S)

A brief explanation of the prior art in reference to the drawings will provide an understanding of the objects of the invention and the limitations of the prior art, as illustrated in FIGS. 1–9.

Figure 1:
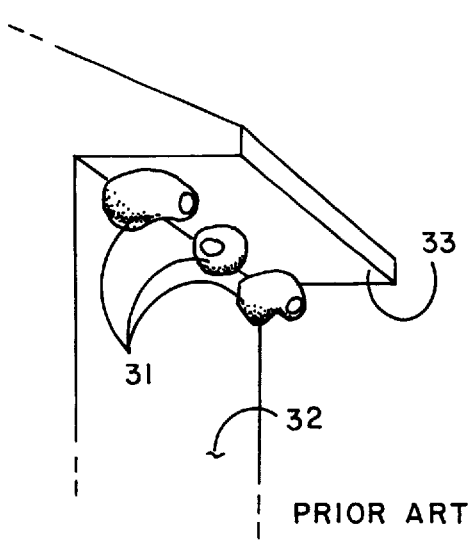
FIG. 1 illustrates a perspective view of directly applied cliff swallow nests randomly built where a building wall intersects the building eaves.

Referring to the drawings, FIG. 1 shows typically built natural cliff swallow random mud nests 31 directly attached to building wall 32 and building eaves 33.

Figure 2:
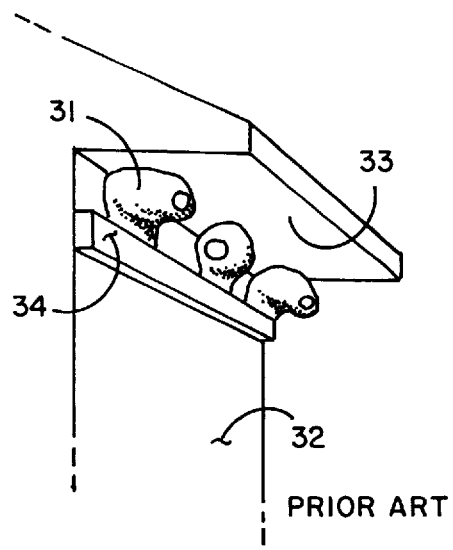
FIG. 2 illustrates a perspective view of directly applied nests randomly built, but supported by the narrow edge of a prior art board attached flat to the side of a building parallel and close to the eaves.

FIG. 2 shows prior art support board 34 nailed flat to building wall 32, with random nests 31 supported but also attached directly to wall 32 and eaves 33.

Figure 3:
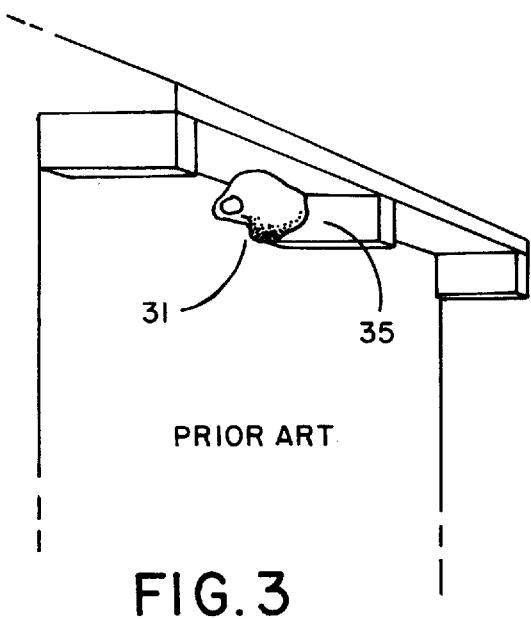
FIG. 3 illustrates a perspective view of a directly applied nest, randomly oriented, but partially supported by a vertical surface of a projecting roof rafter end.

FIG. 3 shows random nest 31 supported in part by vertical surface of rafter end 35.

Figure 4:
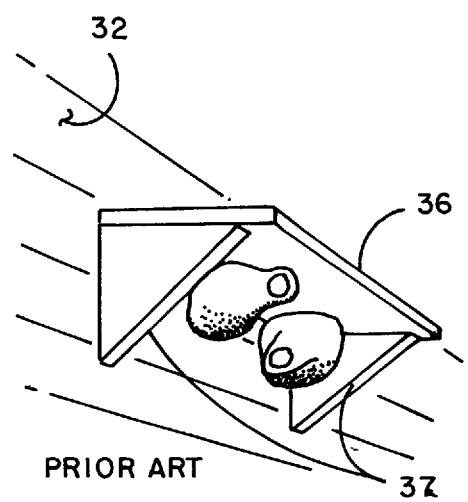
FIG. 4 illustrates a perspective view of nests directly applied to the side of a building and an attached prior art overhead shelf, with widely spaced vertical brackets to support the shelf.

FIG. 4 shows prior art horizontal shelf 36 supported by brackets 37. Randomly built nests 31 are attached directly to building wall 32 and bracket 37 and underside of shelf 36 or wall 32 and shelf 36 only. All nests 31 in FIG. 1–FIG. 4 are at least partially attached to buildings and may allow nest parasites to easily infiltrate buildings.

FIG. 5 shows random nests 31 attached within small I-beam 38 where crossed overhead by water supply pipes 39, as is common under bridges. All nests in FIG. 1–FIG. 5 are subject to collapse for one or more of the reasons already described in detail in the objects, including poor adhesion to smooth or painted surfaces, cracking due to different expansion of dissimilar adjacent surfaces, cracking due to vibration, and limited structural support. Interiors of random nests 31 are inaccessible and difficult to retroactively support, as is conveniently possible with the present invention. Supporting paint surfaces can be defaced or damaged by mud or bird excrement in these foregoing prior art situations.

FIG. 6 shows prior art single open nest platform 40 attached to building wall 32, and dependent on building eaves 33 for shelter. Open nest platform 40 is a wide, single nest structure intended for "open cup" nesters such as robins and does not suit cliff swallows.

FIG. 7 shows a prior art more enclosed nest platform 41 which is attached to building wall 32, and is not dependent on building eaves 33 for shelter. Single enclosed nest platform 41 is intended for other species and does not suit the requirements of cliff swallows.

FIG. 8 shows four artificial bowl-shaped partial nests 42 arranged near building eaves 33 and attached to building 32. Two random nests 31 have been completed by swallows and are attached directly to building surfaces. As such, they are subject to and create the problems described for situations illustrated in FIGS. 1–5.

FIG. 9 shows artificial complete nests 43 removably hung on mounting board 44. One has been removed by hand for inspection, breaking the mud seal 45 made by swallows. Breaking the mud seal 45 and moving the artificial nest 43 may disrupt nestlings as opposed to the non-disruptive inspection made possible with the present invention.

While the invention may be embodied in many different forms, a preferred embodiment is illustrated and will be described in specific form with the understanding that the disclosure is to be considered as an exemplification of the principles of the invention and is not intended to limit the invention to the specific embodiment illustrated and described.

Figure 10:
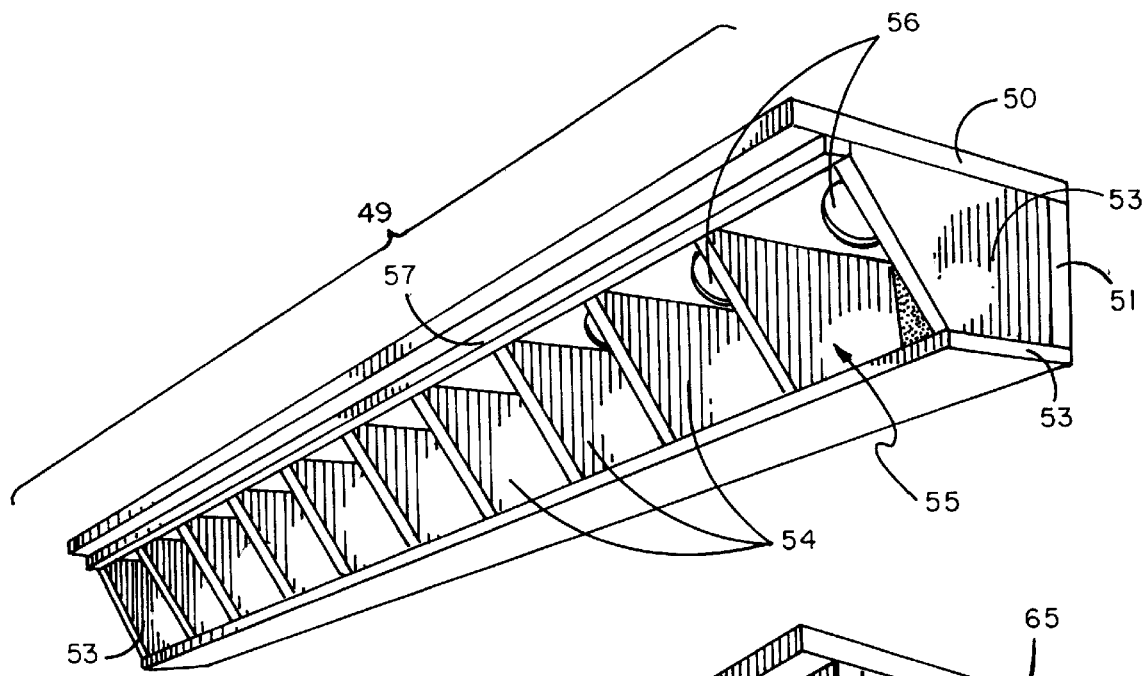
FIG. 10 illustrates a perspective view from below of a preferred embodiment of the present invention.

Referring to the drawings again, FIG. 10 shows a multiple nesting structure for cliff swallows 49. Wide overhanging roof 50 is joined along its back edge to upper edge of back wall 51. Back wall 51 is joined along its lower edge to the back edge of narrow floor 52. These three parts form a channel which is asymmetrical in cross-section. End panels 53 further enclose the structure. Divider panels 54 divide the structure into separate nest compartments 55. Roof access doors 56 are located so that there is one for to every nest compartment 55. Top crossing strip 57 is permanently fastened across the upper front edges of end panels 53 and divider panels 54. These must be at least 3½" but not more than 6½" between adjacent divider panels, or between an end panel and an adjacent divider panel to accommodate single nests.

Figure 11:
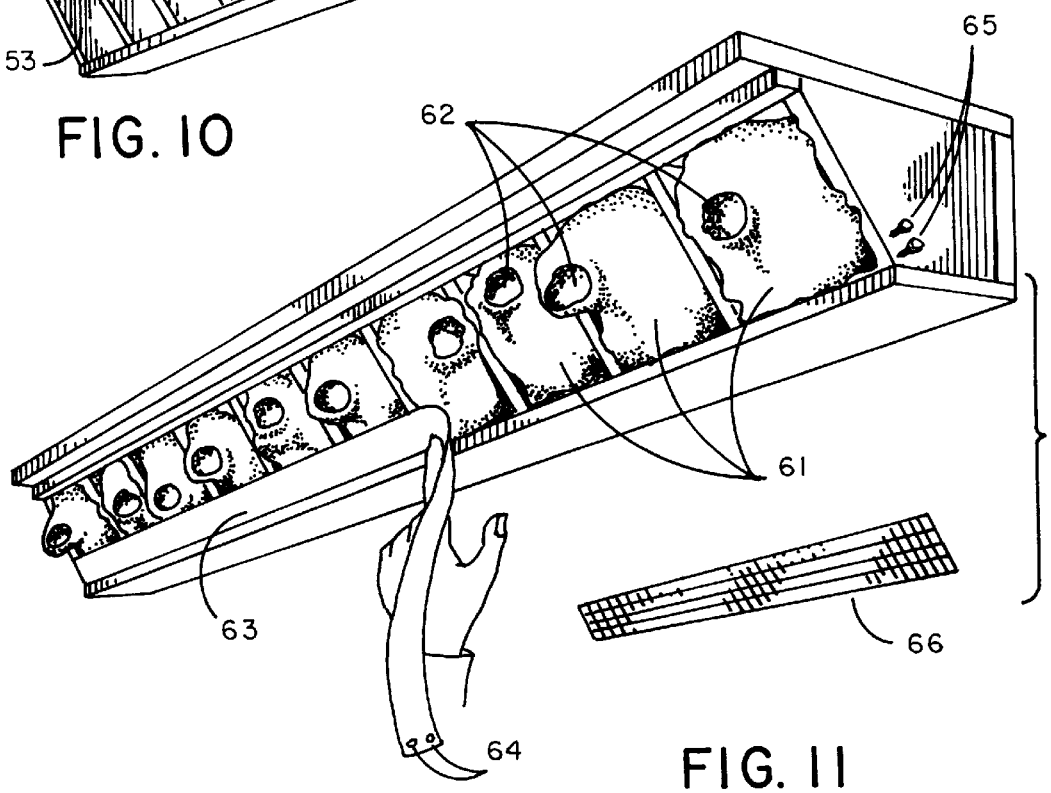
FIG. 11 illustrates a perspective view from below of the present invention when nested in by cliff swallows, with a band to support nests being put in place.

FIG. 11 shows orderly nests 61 built by a colony of cliff swallows. The multiple nesting opportunity is very attractive to swallows which prefer to nest in close proximity. Bird entry holes 62 tend to be located in the upper part of the orderly nests 61. The orderly arrangement encouraged by the overall design of the multiple nesting structure 49 permits the protection of orderly nests 61, once built. A supportive and protective temporary band 63 is shown being applied across the lower portions of orderly nests 61. When temporary band 63 is fully extended, attachment grommets 64 can be slipped over attachment pins 65. With temporary band 63, or strip of wire mesh 66 stapled in place, nests 61 and nest contents are protected from collapse or inflicted damage from vandals throwing rocks or animal predators. This protection would be inconvenient, if ever conceived of, in the prior art due to random nest locations and random orientation of bird entries in the prior art.

Figure 12:
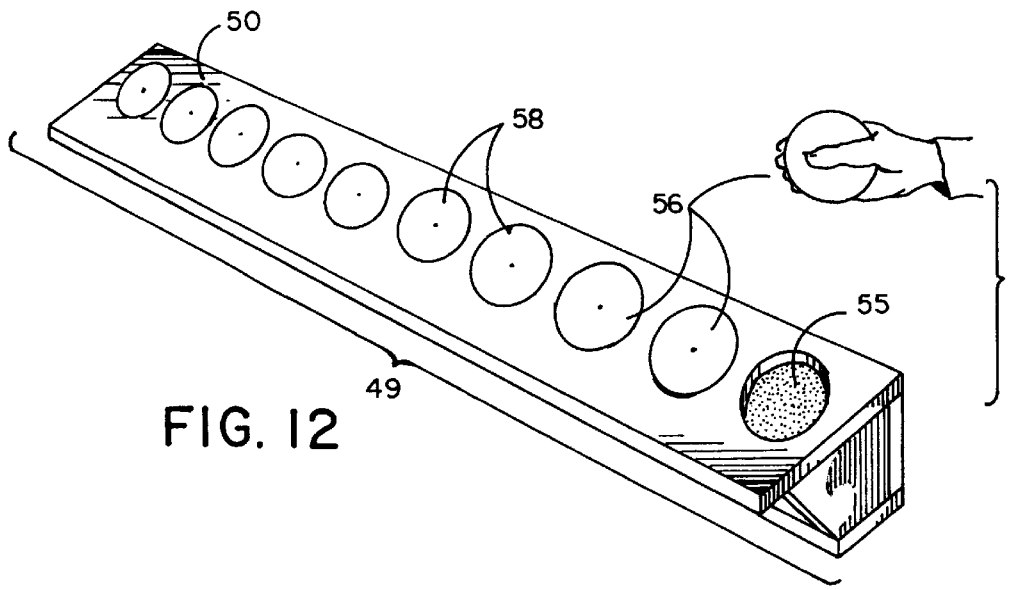
FIG. 12 illustrates a perspective view from above of the present invention, showing one access door removed for inspection or access to nest interior.

FIG. 12 shows the multiple nesting structure 49 when viewed from above. Roof access doors 56 are set into holes cut in roof 50. One access door 56 has been removed to reveal an individual nest compartment 55 and permit access thereto by an individual. Small holes 58 permit insertion of a prying tool to remove roof access doors 56. The access to nest interiors, made possible by the access doors in combination with the overall design of the unit, fulfills a very important object of the invention. Scientific study and management control of nestlings permitted by this access is a major advantage of the present invention over the prior art.

Figure 13:
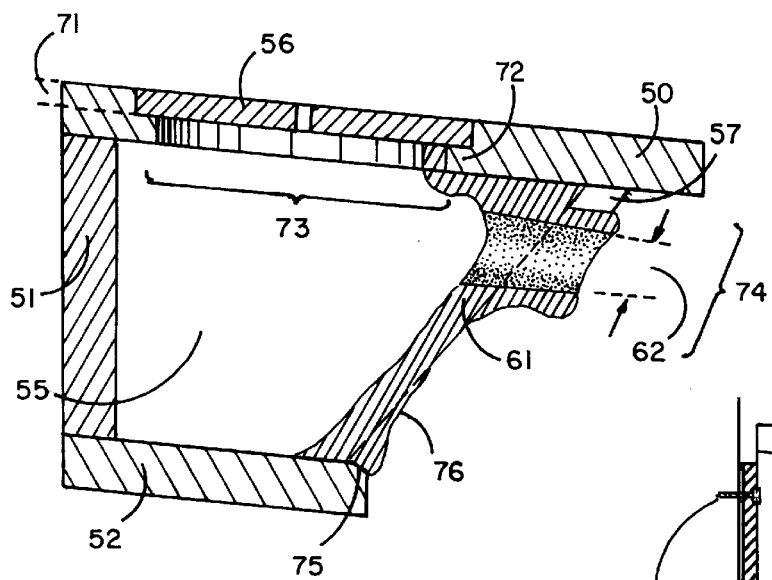
FIG. 13 illustrates an enlarged cross-sectional view, showing how the roof access door is recessed into the roof and how swallows typically use features provided to anchor their nests.

FIG. 13 shows how cliff swallows take advantage of the structure provided by the overall design of the present invention to complete an ideal nesting cavity. In this cross-sectional view roof access door 56 is recessed into a hole cut in roof 50. Recessed rabbet 71 secures the loose roof access door 56 and holds the lower plane of door 56 above the plane of the underside of roof 50. This is important because while cliff swallows will use the forward lip 72 of the access hole 73 to strongly attach their orderly nests 61, the under surface of access door 56, being higher, will not receive enough mud to interfere with opening. Top crossing strip 57 serves to keep nest 61 in place and to support the tops of many entry tunnels 74. This helps prevent collapse of tunnels 74 when vulnerable older nestlings sit in bird entry holes 62 awaiting feeding. Nests are also anchored by bevel 75 on the front edge of floor 52. The forwardly, upwardly angled front edges 76 of end panels and divider panels serve as points of attachment and support and influence the shaping of orderly nests 61. A roughened, unplaned texture of nest attachment surfaces serves to help prevent nest collapse.

The downward slope of roof 50 and floor 52 also makes compartments attractive to and efficiently built in by swallows. The overhang of wide roof 50 is attractive to swallows and supportive of their nest shapes and protective against weather. The height of back wall 51 being at least 2" but not more than 7" with a preferred height of 4" and the height of end panels and divider panels establishes a biologically ideal and structurally sound height for orderly nests 61. The narrow width and downward slope of floor 52 are not hospitable to the large loose grass nests of destructive English sparrows but will accommodate the small based nests of cliff swallows and will retain nest contents even if much of the front mud wall collapses. There must be at least 2" but not more than 4½" from the front lower edge of back wall 51 to the top edge of bevel 75.

Figure 14:
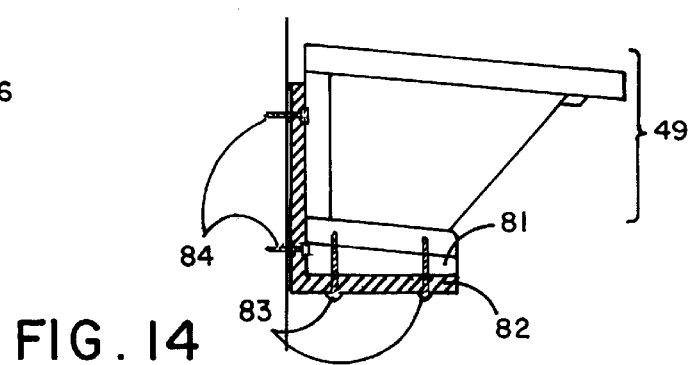
FIG. 14 illustrates a side elevational view of the present invention, showing a leveling block and metal mounting bracket to attach the nesting structure to the wall of a building.

FIG. 14 shows a leveling block 81, a wall bracket 82, attachment screws 83 and wall screws 84 for conveniently mounting the multiple nesting structure 49 on the sides of buildings. The wall bracket 82, shown here in an end view, can be narrow in cross section so that parasites would have only limited points at which to cross over to infiltrate buildings.

Figure 15:
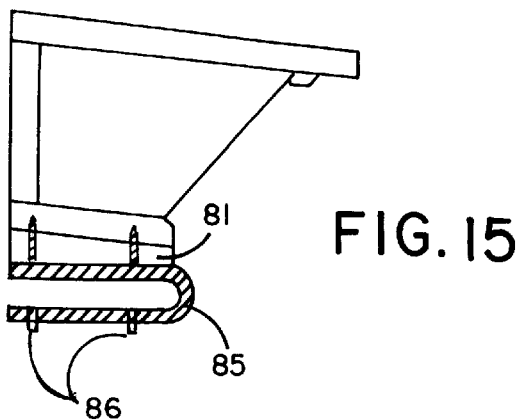
FIG. 15 illustrates a side elevational view of the present invention, showing a leveling block and metal mounting clamp to attach the nesting structure to the lower flange of a bridge I-beam.

FIG. 15 shows leveling block 81 and clamp 85 for mounting on the lower flange of a large I-beam. Set screws 86, threaded into the clamp, are tightened against the under surface of the I-beam.

Figure 16:
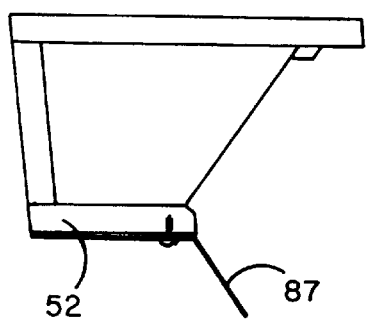
FIG. 16 illustrates a side cross-sectional view of the present invention, showing an extendible and reversible wire mesh guard in a stored position under the nesting structure.

FIG. 16 shows a slideably adjustable wire mesh sliding guard 87 in a retracted position beneath floor 52.

Figure 17:
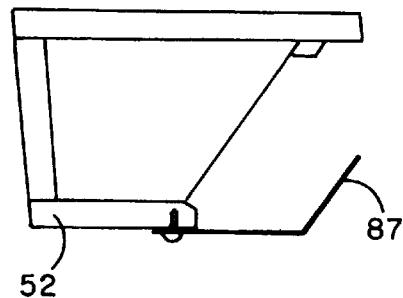
FIG. 17 illustrates a side cross-sectional view of the present invention, showing the wire mesh guard in a reversed and extended protective position under and in front of the nesting structure.

FIG. 17 shows sliding guard 87 in a protective, reversed, extended position. This position catches falling nestlings and deflects rocks thrown by vandals.

Figure 18:
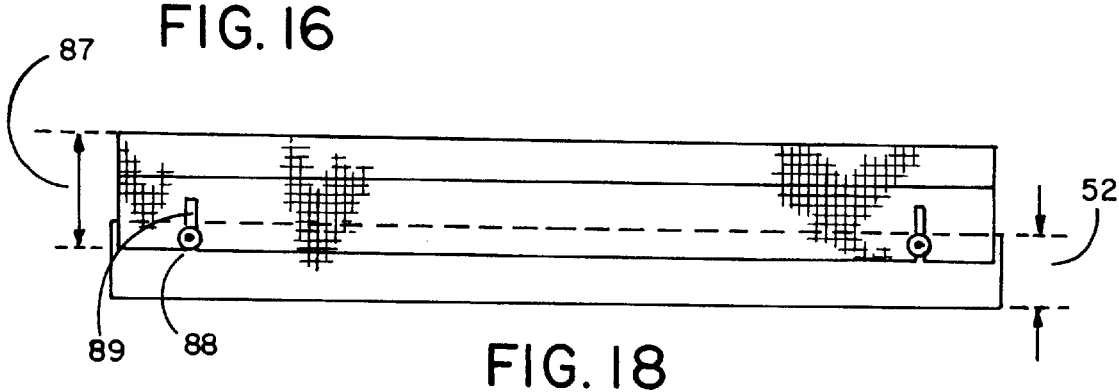
FIG. 18 illustrates an underside view of the wire mesh guard of FIG. 17 slid out to the extended protective position.

FIG. 18 is a view from below of sliding guard 87 in an extended position. Guard fasteners 88 retain the guard while permitting movement through slot 89.

Figure 19:
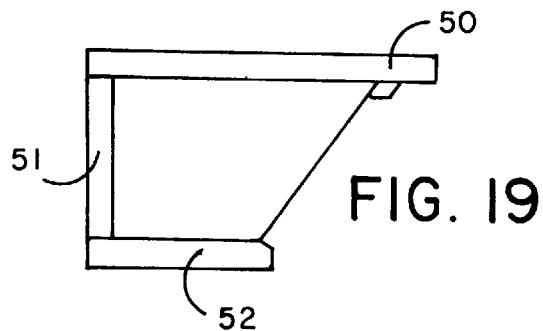
FIG. 19 illustrates a side elevational view of an alternate embodiment in which the roof and floor do not slope forward, as described previously, but are disposed at right angles to the back wall for simplification of construction.

FIG. 19 is an end or side view of an alternate embodiment of the present invention in which roof 50 and floor 52 are joined to back wall 51 at a 90 degree angle for convenience in manufacture. Roof 50 and floor 52 can also be angled upwards or be at different angles from one another in some embodiments of this invention.

Figure 20:
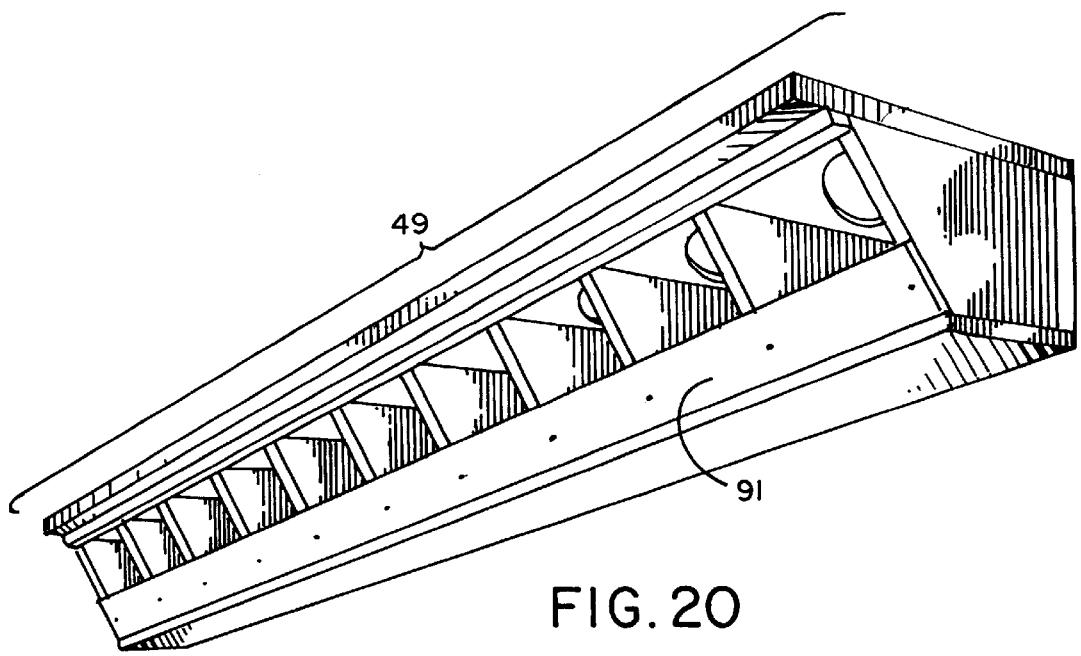
FIG. 20 illustrates a perspective view from below of an alternate embodiment of this invention, showing the preferred embodiment altered by the permanent attachment, at time of manufacture, of a solid protective strapping across the lower portions of all compartments.

FIG. 20 shows an alternate embodiment of the present invention in which a solid permanent strip 91 is fastened across the entire lower front portion of multiple nesting structure 49 at the time of manufacture. This eliminates the need for placing a protective temporary band 63, as shown in FIG. 11, after the nests are completed. However, English sparrows may find this permanent, more complete enclosure more attractive.

Figure 21:
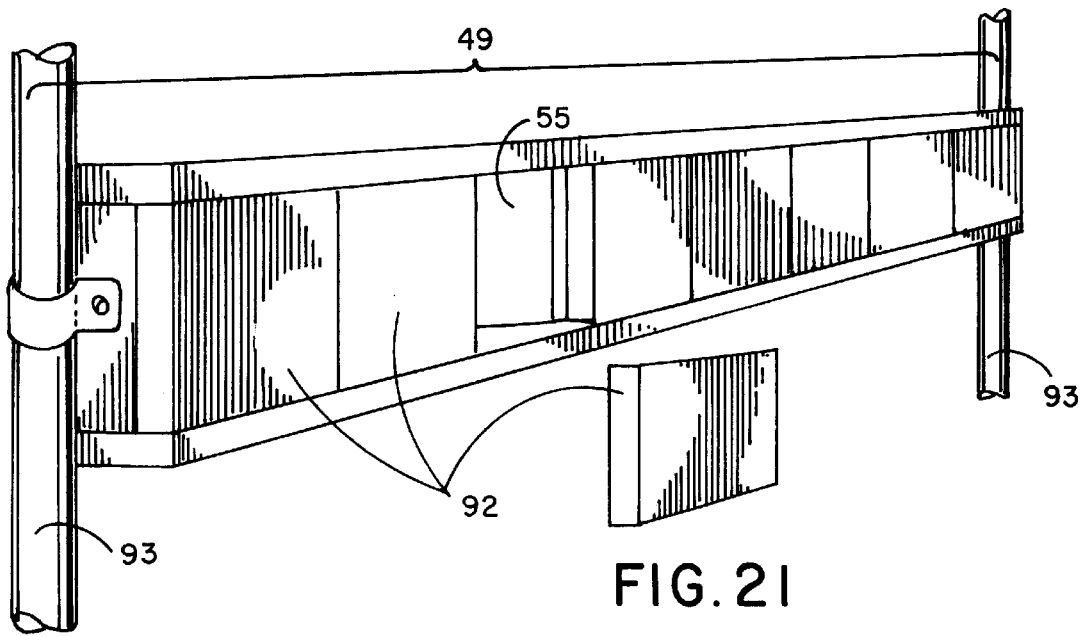
FIG. 21 illustrates a perspective view from the rear of a freestanding, pipe-mounted nesting structure of this invention. In this alternate embodiment the nest compartments are accessible through a series of rectangular doors which replace the solid, one-piece back wall of the preferred embodiment.

FIG. 21 shows a rear view of an alternate embodiment of the present invention in which the long, one-piece back wall 51 of FIG. 10 is replaced by a series of individually openable, back access doors 92. This variation would permits access to nest compartments 55 in situations where overhead access would not be necessary, such as with freestanding pipe mounting 93 as shown.

Figure 22:
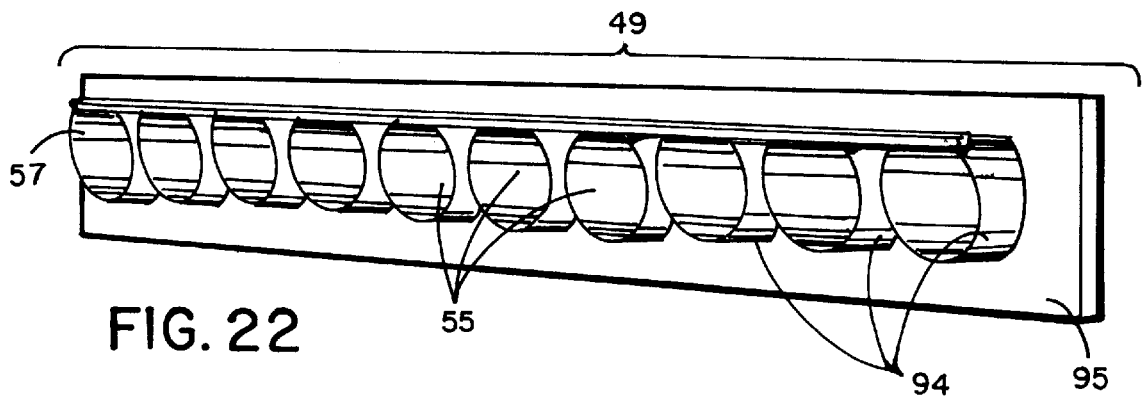
FIG. 22 illustrates a perspective front view of an alternate embodiment of the multiple nesting structure of this invention built of a series of short sections of tubing permanently set in a backboard.

FIG. 22 shows an alternate embodiment in which a series of upwardly angle-cut sections of tubing 94 are set with square-cut ends fixed into matching holes in a back board 95 to form multiple nesting structure 49. Top crossing strip 57 and temporary band 63, as seen in FIG. 11, serve to support and protect nests which will be built in the nesting compartments 55. The surface inside the sections of tubing 94 must be roughened for adhesion of the nests.

Figure 23:
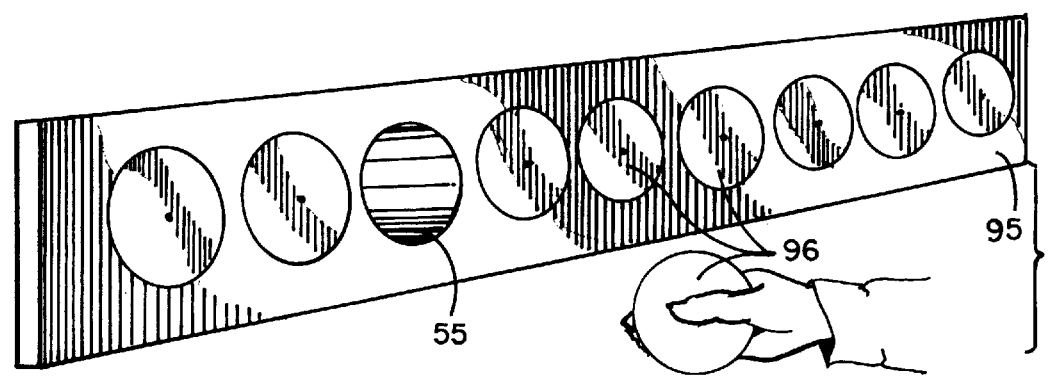
FIG. 23 illustrates a perspective rear view of the embodiment of FIG. 22, showing how a circular door is removed to inspect or access each nest compartment.

FIG. 23 shows a rear view of the embodiment of FIG. 22 in which one of the round back access doors 96 is removed to gain access to nest compartment 55.

Figure 24:
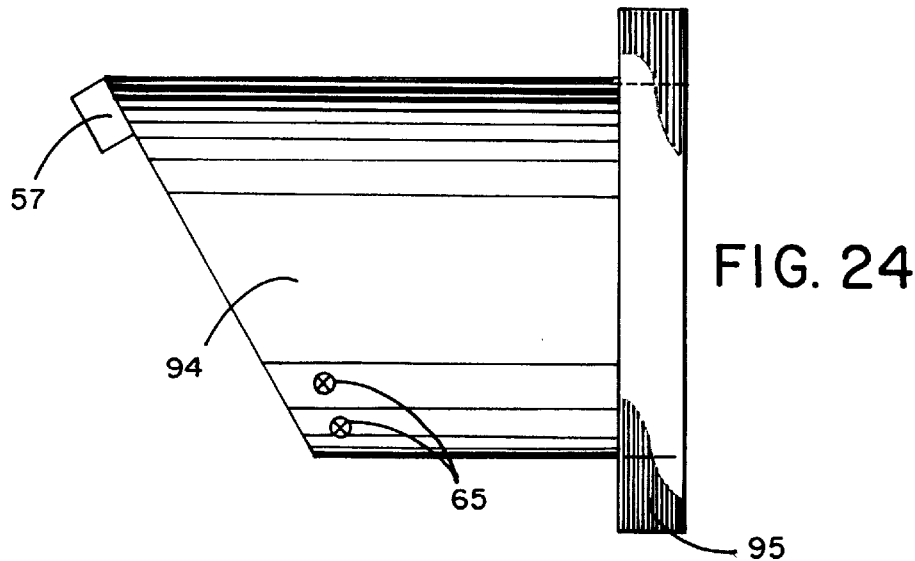
FIG. 24 illustrates an enlarged side view of the alternate embodiment of FIGS. 22 and 23, showing the shape and structure of their nest compartments.

FIG. 24 is an enlarged side or end view of a tubing section 94 set into back board 95. Top crossing strip 57, and the temporary band 63 of FIG. 11 when attached to attachment pins 65, will retain nests in place. The circular internal shape of the tubing sections 94 complement the natural shape of the cliff swallow nests. The forward, upward angle of the front rim of the angle-cut tubing sections 94 encourage efficient and sound mud nest construction. The internal front to back size of the floor works best to attract and protect swallows but not English sparrows if it is at least 2" but not more than 4½" in length.

Figure 25:
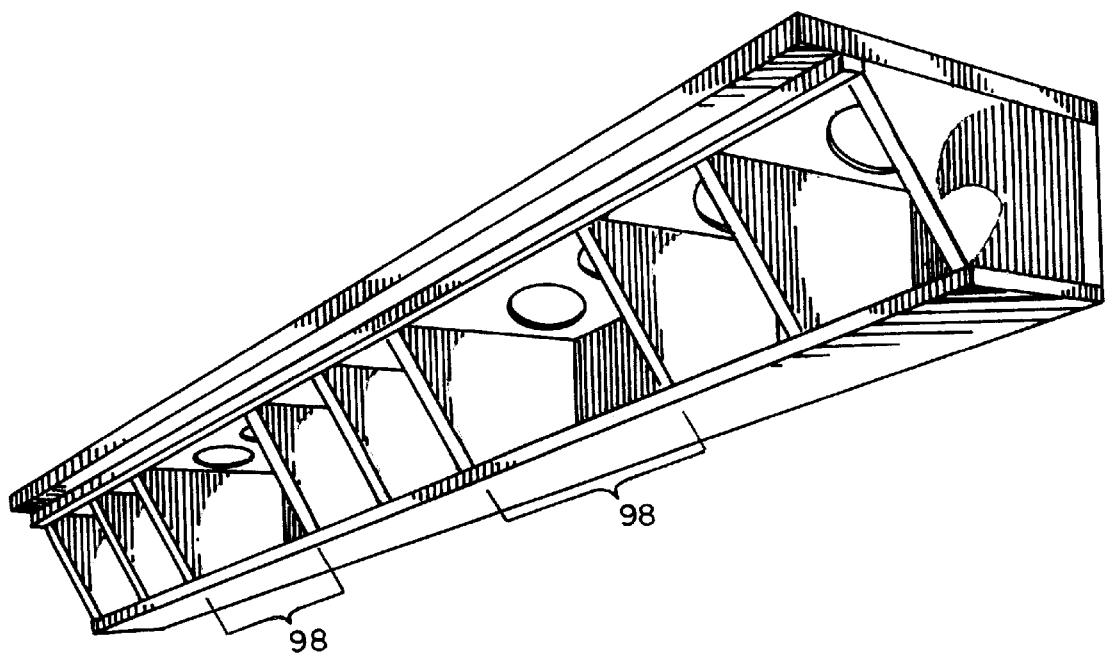
FIG. 25 illustrates an alternate embodiment including two double nesting compartments.

FIG. 25 shows an alternate embodiment in which two double nesting compartments 98 have been created by the omission of two divider panels 54 which were shown in FIG. 10. This embodiment allows some freeform building by swallows which may or may not impinge on roof or back access doors.

I claim:

1. A cliff swallow nesting structure having a front, a rear, a top and a bottom, comprising:

a vertically disposed, laterally extending elongated back wall having a height in the range of approximately 2–6½ inches, said back wall having a length, a top, a bottom, first and second sides, first and second ends, said back wall disposed at the rear of said structure;

an overhanging elongated roof member having a length extending laterally substantially the same distance as the length of said back wall, a first side disposed at the front of said structure and a second side disposed at the rear of said structure, said first and second sides each having an underside, said second side of said roof member affixed to said top of said back wall, said roof member extending forward at a slightly downward slope;

an elongated floor member extending laterally having a length extending substantially the same distance as the length of said back wall, said floor member having a first side disposed towards the front of said structure and a second side disposed at the rear of said structure, said second side attached to said bottom of said back wall, said floor member sloping slightly downward and having a depth in the range of approximately 2–4½ inches, said roof member extending further forward than said floor member;

a plurality of partitions spaced apart a distance in the range between approximately 3–6½ inches from one another, each partition having a top, an upper portion, a front portion, a lower portion and a bottom, said partitions disposed perpendicular to said back wall and disposed vertically between said roof member and said floor member, said partitions defining therebetween a plurality of bird nesting areas, with generally one nest between adjacent partitions;

an upper strip member extending along said underside of said first side of said roof member and across said upper front portions of said partitions;

wherein two of said plurality of partitions form end panels, one positioned at each of said first and second ends of said back wall;

wherein said partitions are narrower at their bottoms and wider at their tops; and further including a plurality of access doors, each disposed into a cliff swallow nesting area.

2. The cliff swallow nesting structure of claim 1 wherein said access doors are disposed in said roof member between adjacent partitions.

3. The cliff swallow nesting structure of claim 2 further including a lower strip member extending along the length of said floor member and said lower front portions of said partitions.

4. The cliff swallow nesting structure of claim 1 wherein said access doors are disposed in said back wall between adjacent partitions.

5. The cliff swallow nesting structure of claim 1 further including a mesh guard attached to said floor member and extending forward from beneath said floor member.

6. The cliff swallow nesting structure of claim 1 wherein said structure is made of a material having a rough surface.

7. A cliff swallow nesting structure having a front, a rear, a top and a bottom, comprising:

a vertically disposed, laterally extending elongated back wall having a height in the range of approximately 2–6½ inches, said back wall having a length, a top, a bottom, first and second sides, first and second ends, said back wall disposed at the rear of said structure;

an overhanging elongated roof member having a length extending laterally substantially the same distance as the length of said back wall, a first side disposed at the front of said structure and a second side disposed at the rear of said structure, said first and second sides each having an underside, said second side of said roof member affixed to said top of said back wall, said roof member extending forward at a slightly downward slope;

an elongated floor member extending laterally having a length extending substantially the same distance as the length of said back wall, said floor member having a first side disposed towards the front of said structure and a second side disposed at the rear of said structure, said second side attached to said bottom of said back wall, said floor member sloping slightly downward and having a depth in the range of approximately 2–4½ inches, said roof member extending further forward than said floor member;

a plurality of partitions spaced apart a distance in the range between approximately 3–6½ inches from one another, each partition having a top, an upper portion, a front portion, a lower portion and a bottom, said partitions disposed perpendicular to said back wall and disposed vertically between said roof member and said floor member, said partitions defining therebetween a plurality of bird nesting areas, with generally one nest between adjacent partitions;

a plurality of access doors, one of said doors disposed in said roof member between adjacent partitions; and wherein said roof member has a recess defined therein below the position of each of said doors to provide an additional nest anchoring area.

8. A cliff swallow nesting structure comprising:

a backboard member; and a plurality of tube members, each having a front portion, a top portion and a bottom portion, each affixed perpendicularly to said backboard member and each extending forward therefrom; each tube member having its front portion cut off at an angle such that its top portion extends further forward than its bottom portion, said tube members forming a plurality of cliff swallow nesting areas.

9. The cliff swallow nesting structure of claim 8 further including:

an upper strip member extending across said top portion of each tube member.

10. A cliff swallow nesting structure comprising:

a backboard member;

a plurality of tube members, each having a front portion, a top portion and a bottom portion, each affixed to said backboard member and each extending forward therefrom; each tube member having its front portion cut off at an angle such that its top portion extends further forward than its bottom portion, said tube members forming a plurality of cliff swallow nesting areas;

an upper strip member extending across said top portion of each tube member; and a plurality of access doors, each disposed in said backboard behind each of said tube members.

* * * * *